(12) United States Patent
Weinberg et al.

(10) Patent No.: US 6,448,926 B1
(45) Date of Patent: Sep. 10, 2002

(54) MULTI-BAND, MULTI-FUNCTION INTEGRATED TRANSCEIVER

(75) Inventors: Aaron Weinberg, Potomac, MD (US); Marc Harlacher; Scott Bierly, both of Herndon, VA (US); Kenneth Cunningham, Hamilton, VA (US); Daniel Urban, Boca Raton, FL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/382,202

(22) Filed: Aug. 23, 1999

Related U.S. Application Data (63) Continuation-in-part of application No. 08/736,110, filed on Oct. 24, 1996, now Pat. No. 6,020,845, which is a continuation-in-part of application No. 08/154,410, filed on Nov. 19, 1993, now Pat. No. 5,572,216.
(60) Provisional application No. 60/097,689, filed on Aug. 24, 1998.

(51) Int. Cl.[7] .................................................. H04B 7/185
(52) U.S. Cl. ...................... 342/357.06; 342/51; 342/385; 375/152
(58) Field of Search ............................. 342/51, 357.06, 342/385, 361, 362; 375/143, 152

(56) References Cited

U.S. PATENT DOCUMENTS

| | | | |
|---|---|---|---|
| 4,550,414 A | 10/1985 | Guinon et al. ................ 375/1 |
| 4,785,463 A | 11/1988 | Janc et al. .................... 375/1 |
| 5,202,903 A | * 4/1993 | Okanoue ................... 375/100 |
| 5,375,146 A | 12/1994 | Chalmers ................... 375/103 |
| 5,377,225 A | * 12/1994 | Davis .......................... 375/1 |
| 5,414,699 A | 5/1995 | Lee ............................. 370/18 |
| 5,420,593 A | 5/1995 | Niles ......................... 342/357 |
| 5,471,509 A | 11/1995 | Wood et al. ................ 375/350 |
| 5,528,624 A | 6/1996 | Kaku et al. ................ 375/206 |
| 5,572,216 A | 11/1996 | Weinberg .................. 342/357 |
| 5,606,575 A | 2/1997 | Williams ................... 375/219 |
| 5,627,855 A | 5/1997 | Davidovici ................ 375/207 |
| 5,638,362 A | 6/1997 | Dohi et al. ................. 370/342 |
| 5,640,416 A | 6/1997 | Chalmers ................... 375/206 |
| 5,696,762 A | 12/1997 | Natali et al. .............. 370/320 |
| 5,781,584 A | 7/1998 | Zhou et al. ................ 375/207 |
| 5,793,796 A | 8/1998 | Hulbert et al. ............ 375/206 |
| 5,872,808 A | 2/1999 | Davidovici et al. ........ 375/207 |
| 5,901,171 A | 5/1999 | Kohli et al. ................ 375/200 |

* cited by examiner

Primary Examiner—Dao Phan
(74) Attorney, Agent, or Firm—Jim Zegeer (57) ABSTRACT

A communications system operating in one or more frequency bands of various number of channels per band (for a total of N channels), and a novel transceiver for receiving these multiple bands of signals. The transceiver comprises an antenna and RF front end for each said band, a separate RF to IF downconverter for each said band. The IF for each band is centered at a succession of frequencies $F_o$ such that the spectra for each band are non-overlapping, with the center frequencies. Analog-to-digital converter sampling rate is chosen such that one band is centered at baseband, and one or more other bands are centered at a specific relationship with the sampling rate such that each band is individually downconverted to baseband by appropriate selection of tap weight multiplying sequences (such as alternating +/− sequence for the case of $F_o$ equal to one-fourth the sampling rate). An analog-to-digital converter converts analog signals to digital signals from the combiner. A digital downconverter converts the digital signals to baseband signals and a single digital processor sequentially time shared among all the bands and channels.

7 Claims, 8 Drawing Sheets

FIGURE 9

MULTI-BAND, MULTI-FUNCTION INTEGRATED TRANSCEIVER

REFERENCE TO RELATED APPLICATIONS

This application is a continuation-in-part of application Ser. No. 08/736,110 filed Oct. 24, 1996 entitled A SYSTEM FOR INCREASING THE UTILITY OF SATELLITE COMMUNICATION SYSTEMS, now U.S. Pat. No. 6,020,845 which, in turn, is a continuation-in-part of application Ser. No. 08/154,410 filed Nov. 19, 1993 entitled SYSTEM FOR INCREASING THE UTILITY OF SATELLITE COMMUNICATION SYSTEMS, now U.S. Pat. No. 5,572,216, both of which are incorporated herein by reference. This application is also the subject of provisional application Serial No. 60/097,689 filed Aug. 24, 1998.

BACKGROUND AND BRIEF DESCRIPTION OF THE INVENTION

Figure 1:
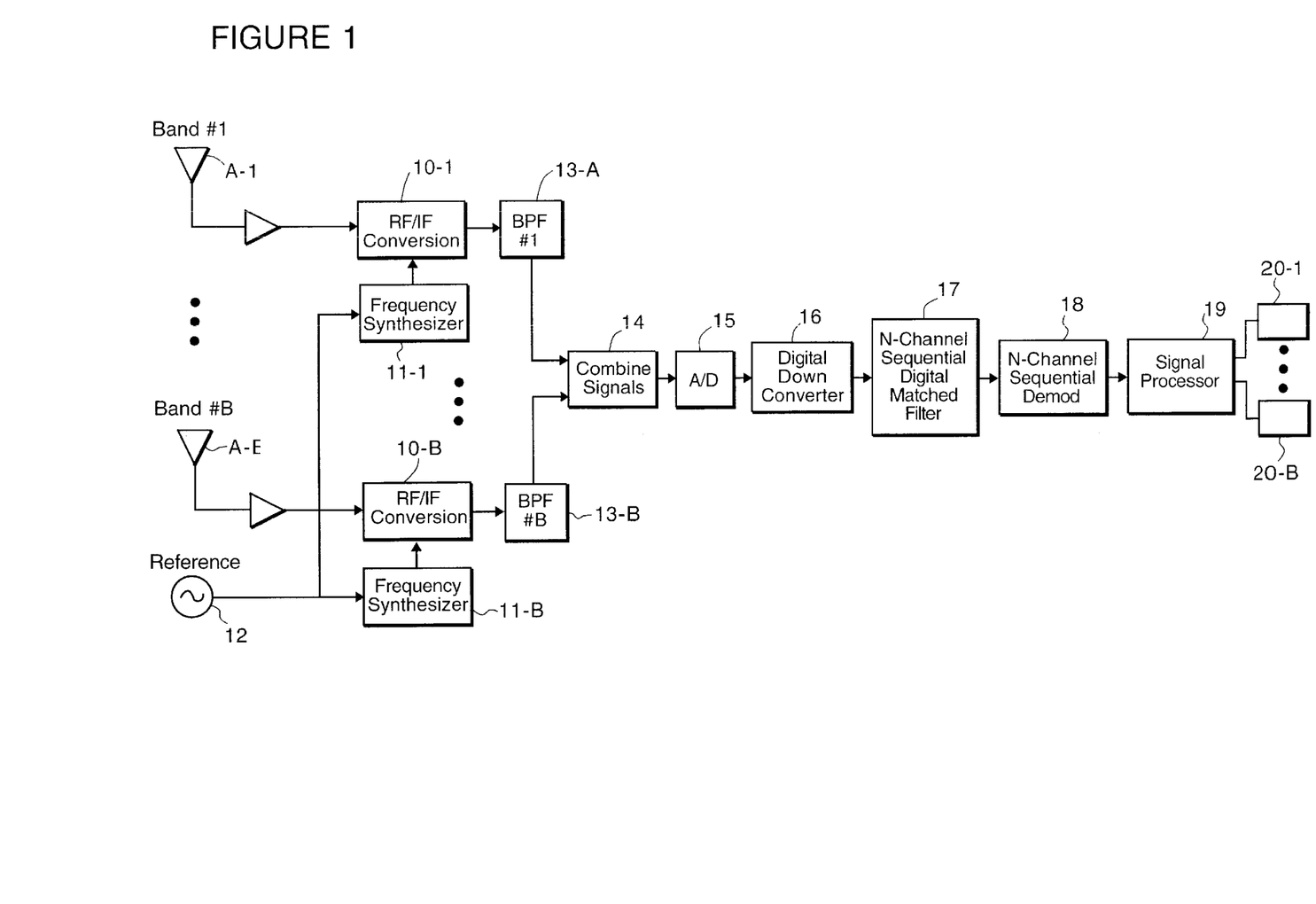
FIG. 1 illustrates the primary novel receiver concept disclosed in this invention, which is the incorporation of multiple signal channels originating from multiple signal bands into a common integrated digital processing path (each band could also function as a transceiver, by adding commonly understood transmitter logic and coupling into the appropriate receiver antenna using a diplexer)

In FIG. 1 of the above-referenced application and patent, a low power transceiver is disclosed (the Figure shows only the receiver portion) in which a transmitter and receiver operate non-coherently, that is, without the requirement that transmitted and received signals bear a fixed electrical frequency and phase relationship so that as a result, the transceiver can be simple and robust and of lower power consumption. One such embodiment integrates a GPS receiver into an existing primary two-way communications system, which accomplishes position location for its user. Moreover, the resulting position location could be caused to be transmitted automatically or on signal from any other transceiver or ground location using the primary link.

The present invention provides wireless communications capability, for either terrestrial or space based operations, involving the simultaneous processing of multiple communications signals and types, received from various and multiple bands, such as an integrated TDRSS/GPS satellite receiver, as well as numerous other waveform and frequency band combinations. The key features of the transceiver are that it is multi-channel/multi-band, leverages ongoing transceiver technology, is low power, is applicable to both spread and non-spread signals (i.e. applicable to a much broader range of users) and provides high performance, rapid acquisition/reacquisition and tracking in a single digital processing path.

Applications of the invention include integrating GPS into a receiver primarily using another communications link, thus providing receiver position and time across that link; among others, tracking and telemetry for launch vehicles (i.e., range safety) using TDRSS/GPS is a prime example of this. Other applications include integrated GPS/GLONASS, multi-mode analog/digital cellular, integrated NASA/Government communications links (i.e., TDRSS, GN, SGLS, etc.).

The invention is directed to communications system operating in one or more frequency bands comprising a various number of channels per band (for a total of N channels), and transceiver means for receiving these multiple bands of signals characterized in that the transceiver comprises a system of antenna and RF front end for each said band, a separate RF to IF downconverter for each said band, said IF for each band centered at a succession of frequencies $F_c$ such that the spectra for each band are non-overlapping, with said center frequencies and analog-to-digital converter sampling rate chosen such that one band is centered at baseband, and one or more other bands are centered at a specific relationship with the sampling rate such that each band is individually downconverted to baseband by appropriate selection of tap weight multiplying sequences (such as alternating +/- sequence for the case of $F_c$ equal to one-fourth the sampling rate), combining means for combining said RF signals, analog-to-digital converter means for converting analog signals to digital signals from said combining means, digital downconverter means for converting said digital signals to baseband signals and a single digital processor sequentially time shared among all said Bands and channels, a signal processor connected to said single digital processor responsible for any final signal and/or data processing or formatting, and a signal transmitter of unspecified design details, coupled into the said transceiver antenna path by means of a diplexer device.

Further, the invention also features a tracking and data relay satellite system operating in the S-band (TDRSS) and in conjunction with a GPS satellite system operating in the L-band, and transceiver means for receiving L-band and S-band characterized in that the transceiver comprises a system antenna and RF front end for each said S-band and L-band signal, a separate RF to IF downconverter for each said S-band and L-band signal, said IF for said S-band signal operating at a frequency $F_o$ and said IF signals for said L-band operating and centered at a frequency $F_o$ plus a predetermined separation frequency so that the spectra for said S-band and the spectra for said L-band are non-overlapping, combining means for combining said IF signals analog-to-digital converter means for converting analog signals to digital signals from said combining means, digital downconverter means for converting said digital signals to baseband signals and a single digital processor sequentially time shared among said S-band and L-band signals, respectively, a GPS navigation processor and a TDRSS data processor connected to said single digital processor, a TDRSS (S-band) signal transmitter of unspecified design details, coupled into the said TDRSS (S-band) transceiver antenna path by means of a diplexer device.

Furthermore, invention also features a multi-Band, multi-channel digital matched filter (DMF) implementation comprising multiple sets (N) of PN-Generators and storage means for maintaining N sets of tap weights within the DMF, N-stage data delay line which shifts the digital data samples down the line at the baseband sampling rate, arithmetic circuitry for multiplying alternate taps of said delay line by one of the stored sets of tap weights, pre-multiplied by the +/- or other appropriate downconversion sequence, and summing each of said products, to form a correlation output sample that is a member of the sequence corresponding to a the channel represented by the selected tap weights; sufficient consecutive such sum-of-products samples are thus formed to form the complete correlation epoch function corresponding to the selected channel, whereby during acquisition, the tap weights for a single channel are manipulated appropriately such that consecutive DMF output samples represent correlation epochs associated with a particular PN alignment (offset), and thus an acquisition detection circuit can observe which of the correlation alignments is of sufficient magnitude to indicate the correct PN alignment, and thus transition that channel into tracking, and during tracking, the tap weights are alternated between various channels and manipulated appropriately such that the output sequence from the DMF thus consists of a sequence of sum-of-products samples that are in fact also a sequence of correlation epochs corresponding to each of the channels being tracked, and during ongoing operations in fact both acquisition and tracking operations among multiple channels may be simultaneously taking place using the said techniques.

DESCRIPTION OF THE DRAWINGS

The above and other objects, advantages and features of the invention will be more apparent when considered with the following specification and accompanying drawings wherein.

DETAILED DESCRIPTION OF THE INVENTION

In the receiver shown in FIG. 1, a B-band, N-channel receiver is disclosed having functional antennae A-1 ... A-B coupled via amplifiers to corresponding RF/IF converters 10-1 ... 10-B which are supplied from corresponding frequency synthesizers 11-1 ... 11-B which in turn are supplied, preferably, from a common frequency source 12. The IF signals are bandpass filtered in 13-A ... 13-B and then combined 14, analog to digital converted 15, downconverted 16, and passed to N-channel digital matched filter 17. The output of N-=channel sequential digital matched filter 17 is demodulated in demodulator means 18 and the demodulated signals for the various channels are processed in data handler or processor 19 and supplied to various utilization devices 20-1 ... 20-B.

Figure 2:
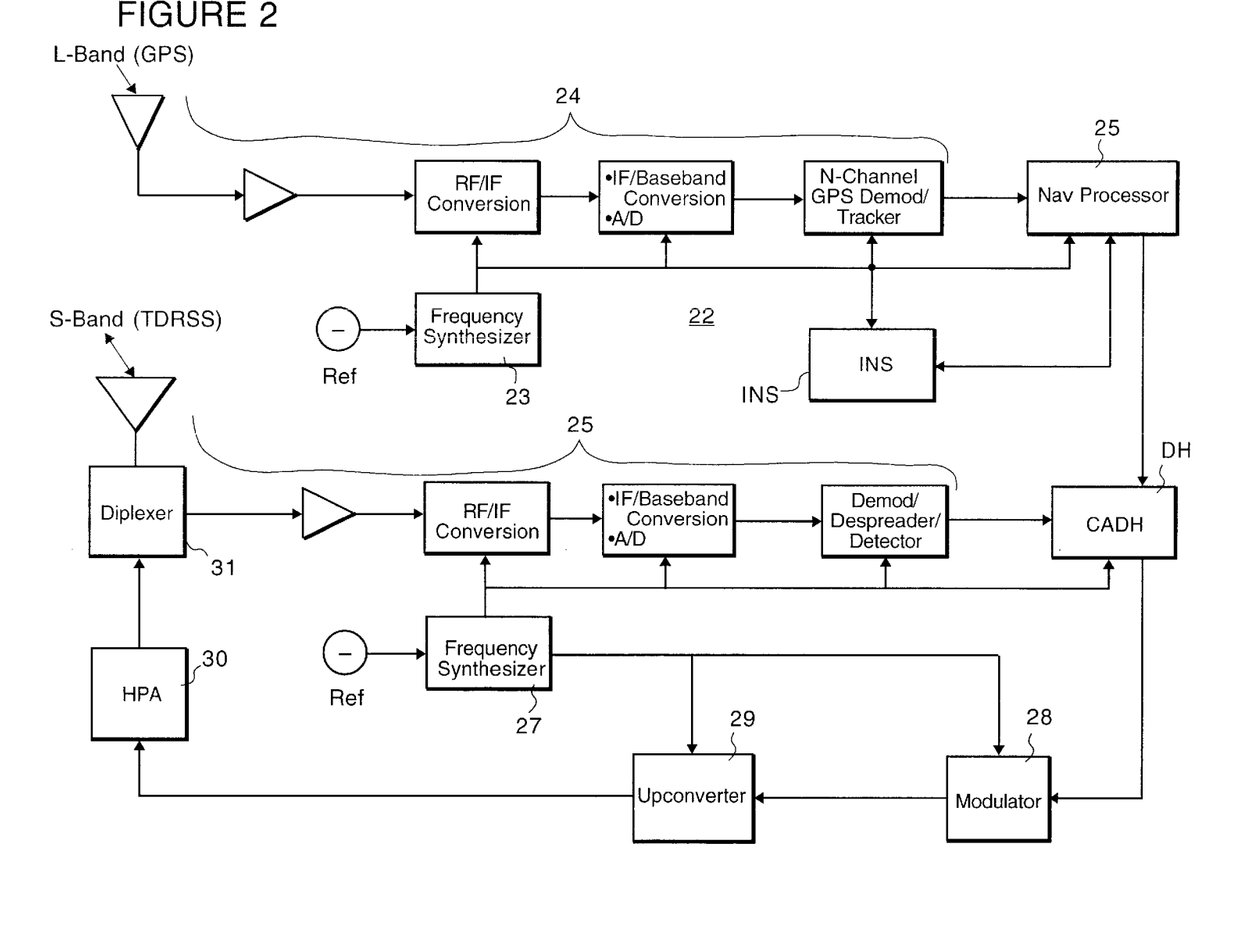
FIG. 2 is a TDRSS transceiver incorporating a GPS receiver which can accomplish position location—essentially an expanded version of FIG. 4 of U.S. Pat. No. 5,572,216.

Referring to FIG. 2, the upper portion 22 of the block diagram is an illustration of an example embodiment of the invention, an L-band (GPS) receiver having a separate frequency synthesizer 23 and RF front end 24 with a navigation processor 25 outputting GPS location signals and a separate S-band (TDRSS) processing channel 25 including an RF front end 26 and a separate receiver channel with a separate frequency synthesizer 27 and a separate transmitter channel having its own modulator 28, upconverter 29 and high-powered amplifier 30 feeding a diplexer 31 for transmissions on the S-band.

According to the present invention, the integrated TDRSS/GPS transceiver maintains separate RF front ends 32, 33 and RF/IF downconverters 34, 35 for both the TDRSS signals, channels and the GPS signal channels (S-band and L-band, respectively). However, according to the present invention, the transceiver has common frequency synthesis 36 and clock reference signals with carefully allocated frequency plans to minimize distinct frequencies and clocks. In addition, the present invention combines the TDRSS and GPS signals from bandpass filters BPF in combining 37 at intermediate frequency (IF) and shares all remaining circuitry to the maximum extent possible. In this way, the TDRSS and GPS IF signals do not spectrally overlap (which thereby avoids signal-to-noise degradation); the TDRSS and GPS IF spectral spacing is carefully selected for efficient digital signal processing. Moreover, the digital baseband processing shares common circuitry so as to enable programmable digital matched filter (DMF) usage, clear or spread modes, and rapid acquisition and reacquisition capability. There is also common sharing of feed-forward tracking and detection for carrier, PN, and symbol timing loops. Finally, it enables a dedicated GPS/inertial navigation processor NP to be incorporated in a small hand-held transceiver unit.

Figure 3:
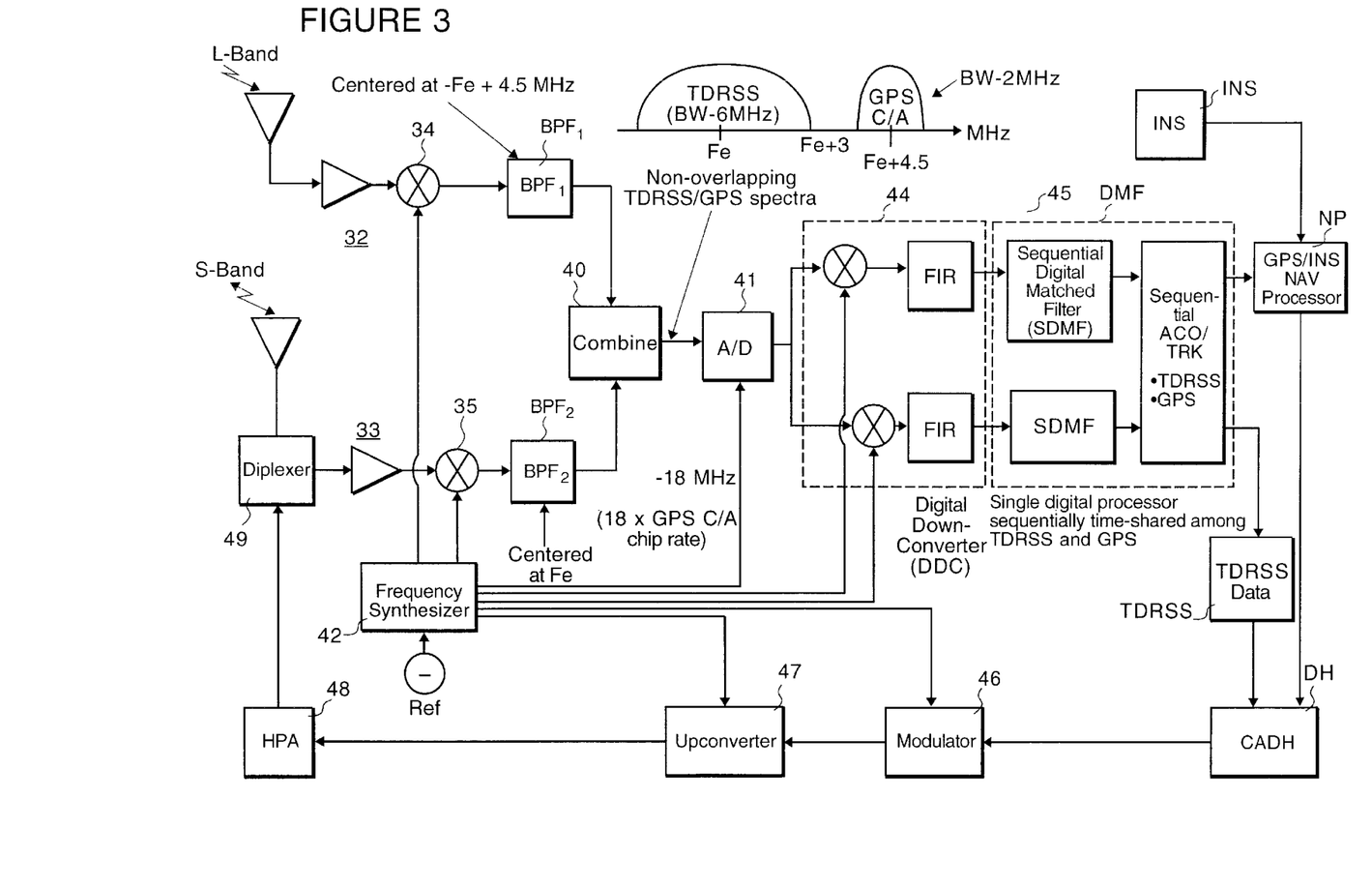
FIG. 3 is a block diagram of one preferred embodiment of the transceiver illustrating an integrated TDRSS/GPS transceiver according to the invention, FIG. 4 discloses a digital matched filter (DMF) for the I or Inphase channel (identical Q or Quadrature channel not shown)

FIG. 3 illustrates one preferred embodiment of the invention, for the case of the integrated TDRSS/GPS transceiver. In this embodiment, note that the receiver channel for the S-band is centered at $F_o$ and that the IF for the L-band is centered at $F_o+4.5$ MHz so that there is non-overlapping TDRSS and GPS spectra. The output of the combiner 40 is supplied to the analog-to-digital converter 41. A common frequency synthesizer 42 is used to provide frequency synthesis and clock references for the transceiver. Note also that the output of the Analog-to-Digital (A/D) converter 41 is fed to a digital downconverter (DDC) 44 which outputs signals to the sequential digital matched filter (SDMF) 45 in a single digital processor sequentially time shared among all TDRSS and GPS channels. An inertial navigation system INS may also be incorporated in the transceiver for purposes of providing the navigation processor NP with inertial navigation signals. The TDRSS signals to be transmitted, which may include GPS positioning information derived from the receiver, are supplied by data handler DH to a modulator 46, upconverted 47 and supplied to the high-power amplifier (HPA) 48 which feeds the diplexer 49 and transmits the signals on the S-band to the satellite S. The circuitry illustrated in FIG. 3 is predicated on the following assumptions:

GPS C/A signal @ L1:
   1575.42 MHz
   1.023 MHz PN chip rate
TDRSS SSA
   Flexible S-band forward link frequency, $F_1$.

$$\text{Corresponding PN chip rate} = \frac{(31) F_l}{(221)(96)}.$$

User forward/return link signals may be spread or non-spread.
Return Link Frequency—$(240/221) F_1$.
Noncoherent operation (since GPS is available).
Users, such as ELV, dynamics warrants rapid acq/reacq receiver (for both TDRSS and GPS).

Figure 4:
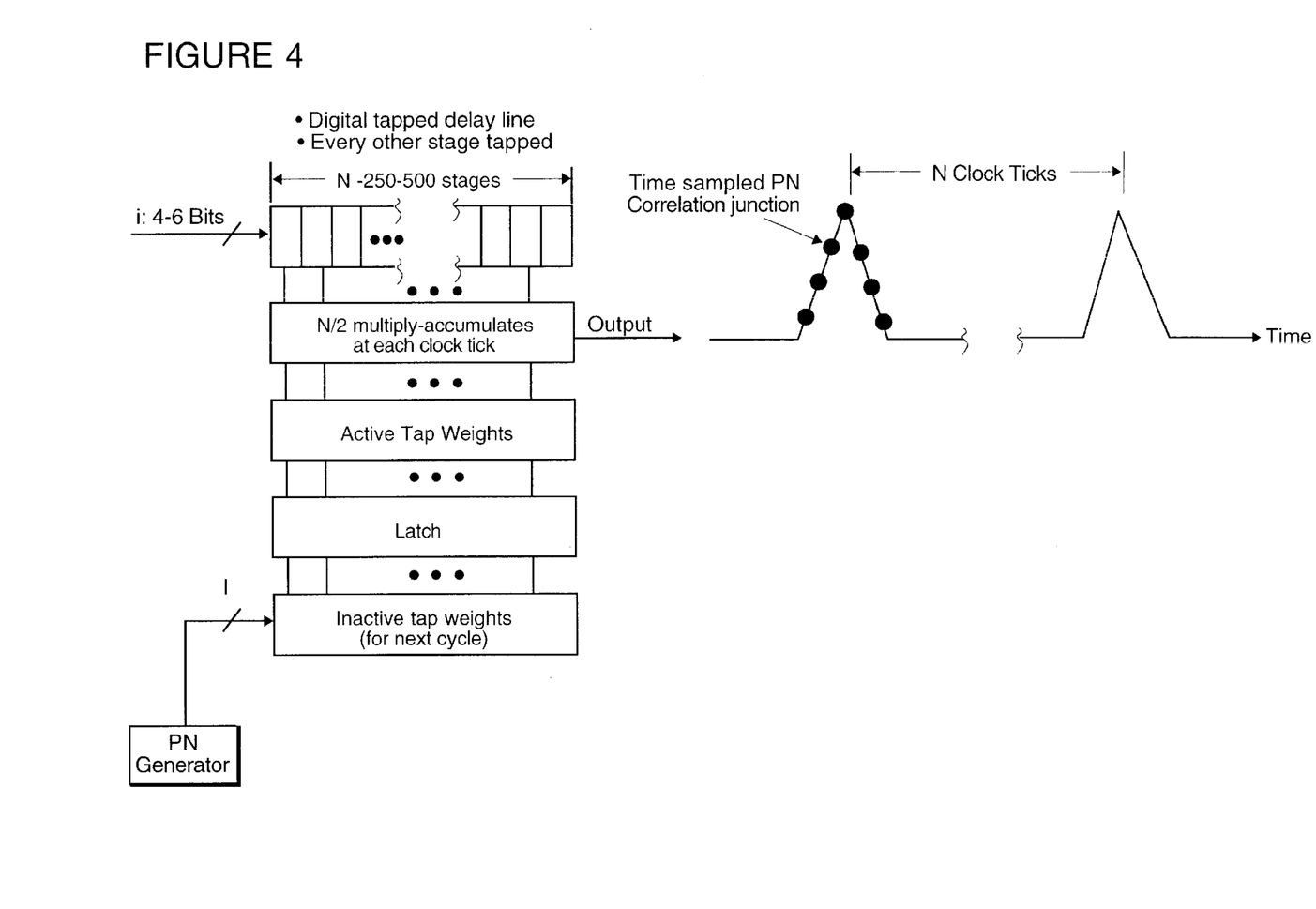

In regards to the referenced digital matched filter (DMF) shown in FIG. 4, note:

During PN acquisition, DMF essentially provides N-fold parallel processing:

Yields ~2 orders of magnitude reduction in PN code acquisition time (spread cases).

All DMF output samples used for acquisition.

During tracking DMF provides on-time, early, late samples:

All other DMF output samples (i.e., most of N-clock cycle), are unused during tracking.

This unused time, during tracking, is the basis for the sequential digital matched filter (SDMF).

Figure 5:
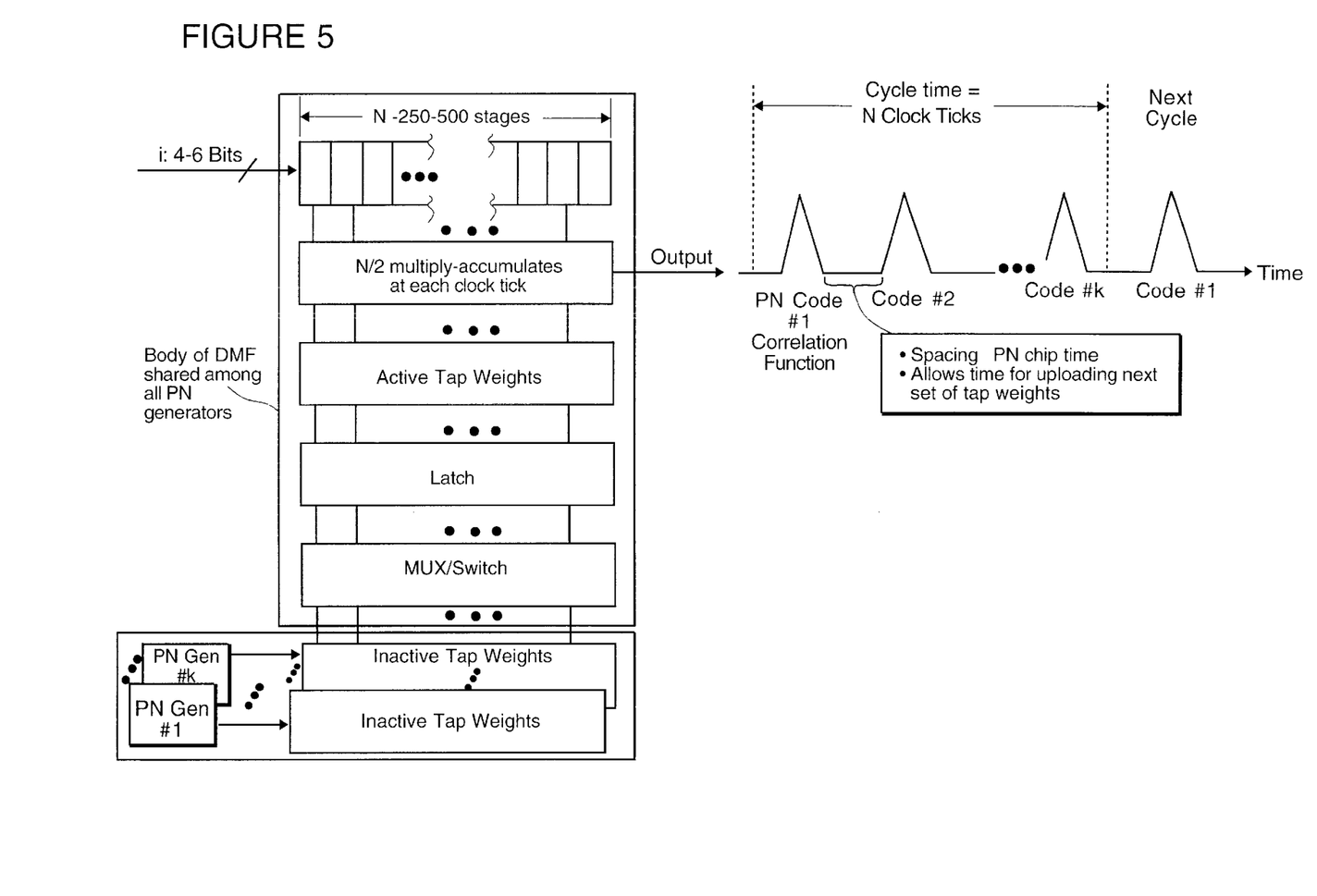
FIG. 5 is a block diagram of a sequential digital matched filter (SDMF) for the Inphase (I) channel shown, illustrating the time sequential correlation epochs that appear at the DMF output for the multiple tracked signals.

Sequential digital matched filter (SDMF) illustrated for the I-channel is shown in FIG. 5. Note:

During tracking, distinct PN correlation functions are uniformly spaced (as driven by the PN tracking loops) in time at the DMF output, as shown.

The full cycle time is used in the DMF, in contrast to the reference DMF (where almost the entire cycle time goes unused during tracking), On-time, early, late samples sequentially used by single set of acquisition/tracking hardware/software to track all signals.

Cycle time can be flexibly allocated to:

Signal acquisition, or

Signal acquisition of 1 signal while tracking multiple other signals.

Figure 6:
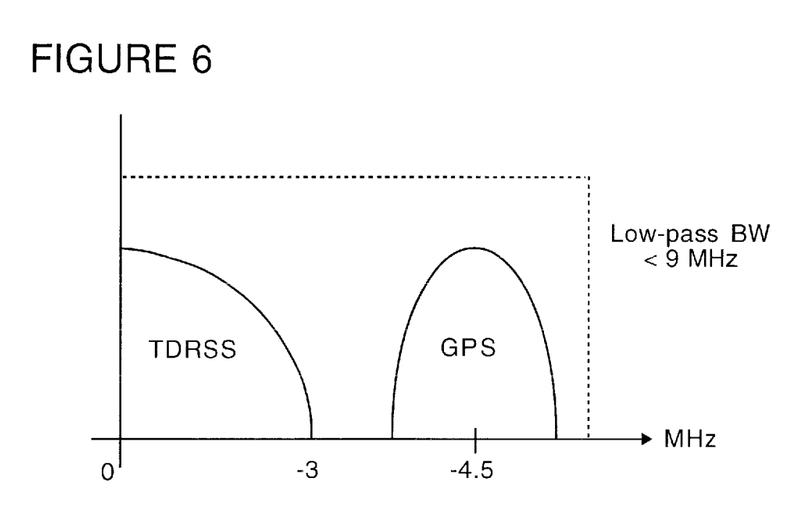
FIG. 6 is a chart showing the spectra separation of the GPS/TDRSS embodiment after the analog signals have been combined.

The key features of digital baseband processing include the following (refer to FIG. 6):

Low-pass spectrum after Digital Downconversion (DDC).

A/D sampling rate is determined by the total bandwidth required for all Bands, plus any desired guard spacing; for the GPS/TDRSS embodiment, the sampling rate= (18)(1.023) MHz (greater than or equal to twice the low-pass composite bandwidth).

The Nyquist Criterion is satisfied

The SDMF sequentially processes TDRSS, GPS signals by suitable DMF tap weight settings.

SDMF processes primary Band (for example, TDRSS) as baseband PN-coded (or clear mode) signal. For the TDRSS example:

PN: DMF tap weights matched to PN code—18×1.023 MHz ~6×TDRSS PN chip rate (note; exactly equals 6×TDRSS PN chip rate, for 3.069 Mcps and $F_1$=2100.384 MHz).

Clear mode: DMF tap weights set to all 1's.

When tap weights set for TDRSS, the other signals (i.e., GPS signals) are filtered out.

SDMF processes a secondary Band (for example, GPS) as IF PN-coded (or clear-mode) signal. For the GPS example:

IF @ 4.5×1.023 MHz.

Sampling rate=4×IF

DMF tap weights set to GPS C/A code modulated by alternating {+,−} sequence (this effectively downconverts the signals to baseband).

When tap weights set for GPS, the other signals (i.e., TDRSS signals) are filtered out.

For the case of further secondary Bands, other schemes for weight adjustment (i.e., to effect other than Fs/4 downconversion) may be used; alternatively, actual digital NCO/modulators may be incorporated into the tap multipliers to perform arbitrary downconversion for each Band.

Figure 7:
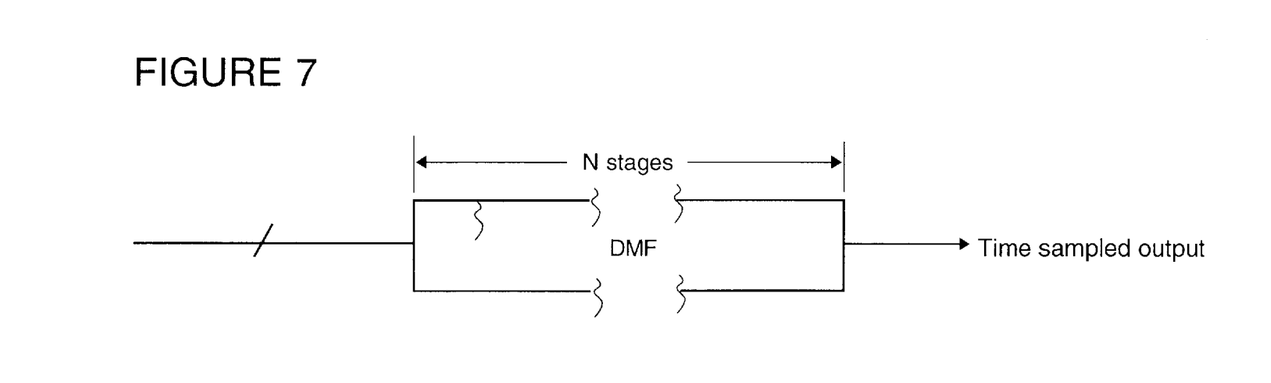
FIG. 7 is a schematic illustration of a digital matched filter computational cycle for the example GPS/TDRSS embodiment.
Figure 8:
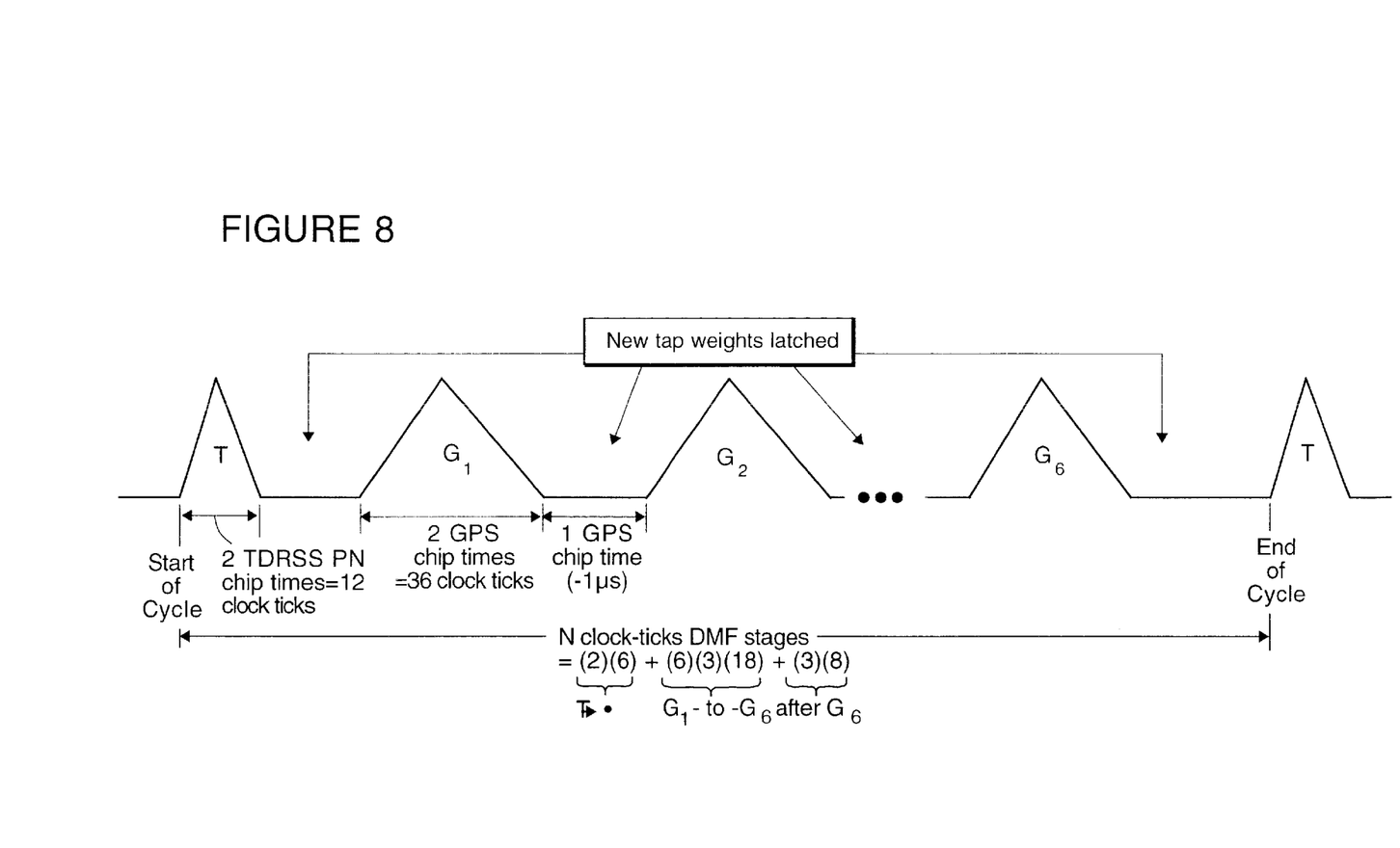
FIG. 8 is an illustrative allocation of a cycle of N clock ticks according to the invention for the example GPS/TDRSS embodiment.

FIGS. 7 and 8 are illustrative of the DMF computational cycle. For the GPS/TDRSS example embodiment, note:

In regards to FIG. 7:

18 clock ticks of each DMF cycle spans:

1 GPS C/A chip

3 TDRSS PN chips (i.e., 6 clock ticks per TDRSS PN chip)

Illustrative allocation of cycle of N clock ticks.

In regards to FIG. 8:

N=354 DMF stages, which supports sequential tracking of 1 TDRSS signal+GPS signals.

DMF I/O delay ~20 ps; accommodates ~10 kHz uncertainty.

Figure 9:
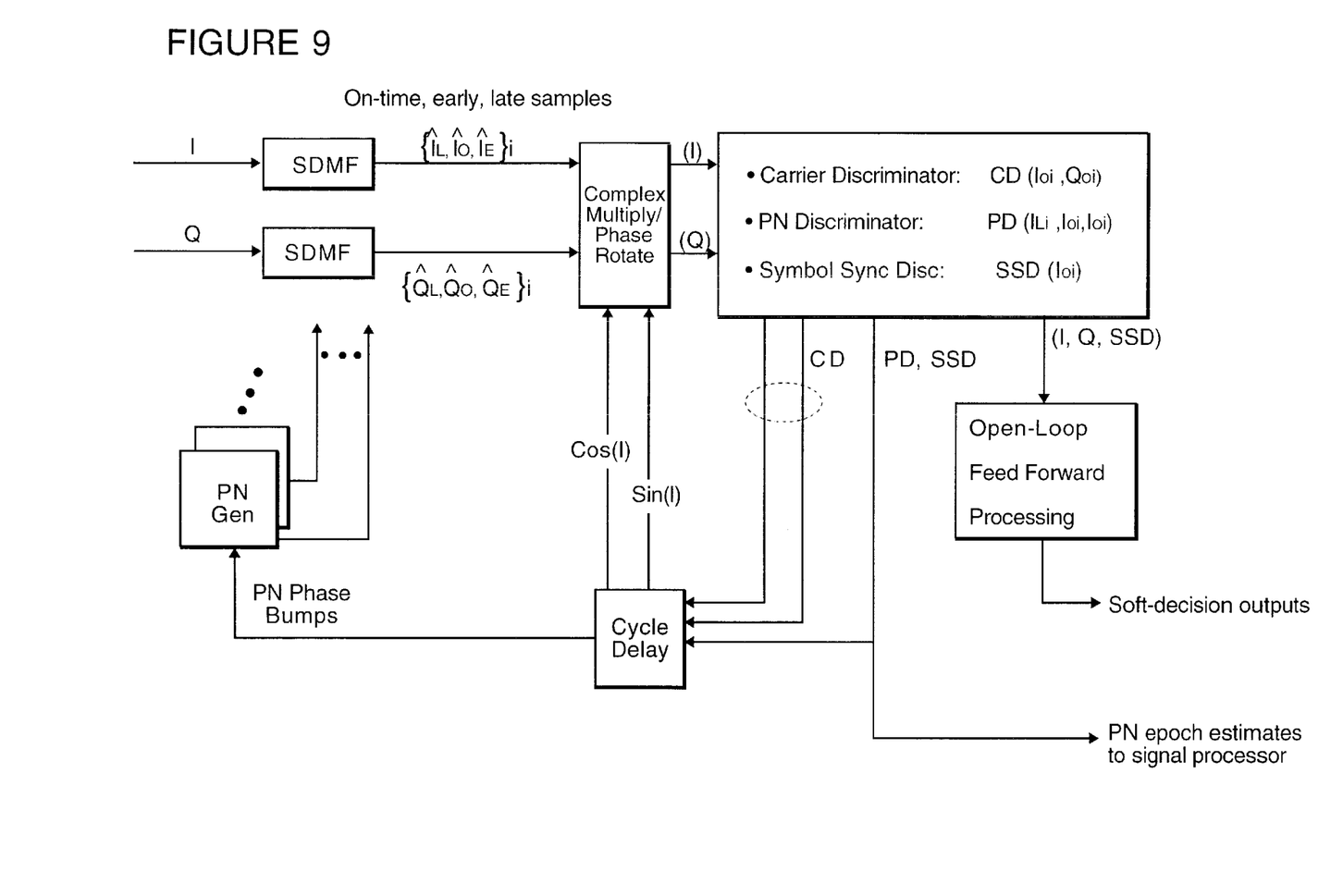
FIG. 9 is a functional illustration of a feed forward sequential tracking algorithm incorporated in the invention.

Referring now to FIG. 9, a functional diagram of the sequential tracking process is illustrated. In this process, the I/Q early/on-time/late tracking samples coming out of the SDMF are phase rotated (for carrier tracking), and then formed into discriminators that are used as feedback to the various tracking loops. Additionally, the on-time samples are further integrated and formed into soft-decision data samples. For the case of GPS, various observables contained within both the SDMF and the tracking circuitry are made available to the Navigation Processor for use in computing time and position. Note that the single set of digital processing functionality is sequentially shared; i.e., although only a single actual hardware/firmware carrier/PN/symbol discriminator capability actually exists physically, N virtual instances of that capability are emulated through time sequencing.

While both a generalized description, as well as an example embodiment, of the present invention has been illustrated and described, it will be appreciated that various other embodiments, adaptations and modifications of the invention will be greatly apparent to those skilled in the art.

What is claimed is:

1. In a communications system receiver operating in one or more frequency bands, consisting of various number of channels per band (for a total of N channels), and for receiving said bands of signals, the improvement in said transceiver comprising:

a system of antenna and RF front end for each said band, a separate RF to IF downconverter for each said band, the IF for each band centered at a succession of frequencies $F_c$ such that the spectra for each band are non-overlapping, with said center frequencies and a signal combiner for combining said signals, an analog-to-digital converter having an analog-to-digital converter sampling rate chosen such that one band is centered at baseband, and one or more other bands are centered at a specific relationship with the sampling rate such that each band is individually downconverted to baseband by appropriate selection of tap weight multiplying sequences, a digital downconverter for converting said digital signals to baseband signals and a single digital processor sequentially time shared among all said Bands and channels, a signal processor connected to said single digital processor for providing any final signal and/or data processing or formatting.

2. In a tracking and data relay satellite system operating in the S-band and in conjunction with a GPS satellite system operating in the L-band, and transceiver for receiving L-band and S-band signals, the improvement in said transceiver comprising:

a system antenna and RF front end for each said S-band and L-band signal, a separate RF to IF downconverter for each said S-band and L-band signal, said IF for said S-band signal operating at a frequency $F_o$ and said IF signals for said L-band operating and centered at a frequency $F_o$ plus a predetermined separation frequency so that the spectra of signals for said S-band and the spectra of signals for said L-band are non-overlapping, a combiner for combining all said spectra of signals, an analog-to-digital converter for converting analog signals to digital signals from said combiner, a digital downconverter for converting said digital signals to baseband signals and a single digital processor sequentially time shared among said S-band and L-band signals, respectively, a GPS navigation processor and a S-band data processor connected to said single digital processor, an S-band signal transmitter coupled into the said S-band transceiver antenna path.

3. A Multi-Band, Multi-Channel receiver having a Digital Matched Filter (DMF) comprising:

multiple sets (N) of PN-Generators and storage device for maintaining N sets of tap weights within the DMF, N-stage data delay line which shifts the digital data samples down the line at the baseband sampling rate, arithmetic circuitry for multiplying alternate taps of said delay line by one of the stored sets of tap weights, pre-multiplied by the +/− or other appropriate down-conversion sequence, and summing each of said products, to form a correlation output sample that is a member of the sequence corresponding to a channel represented by the selected tap weights; sufficient consecutive such sum-of-products samples are thus formed to form the complete correlation epoch function corresponding to a selected channel, whereby, during acquisition, the tap weights for a single channel are manipulated appropriately such that consecutive DMF output samples represent correlation epochs associated with a particular PN alignment (offset), and thus an acquisition detection circuit can observe which of the correlation alignments is of sufficient magnitude to indicate the correct PN alignment, and thus transition that channel into tracking, during tracking, the tap weights are alternated between various channels and manipulated such that the output sequence from the DMF thus includes a sequence of sum-of-products samples that are in fact also a sequence of correlation epochs corresponding to each of the channels being tracked, and during ongoing operations in fact both acquisition and tracking operations among multiple channels may be simultaneously taking place.

4. A communication receiver system for receiving multiple bands having multiple channels, at least some of said bands in said multiple bands do not spectrally overlap and said receiver including a digital down converter, a matched filter connected to said digital down converter for multiplying alternate taps of a delay line by all of the sets of stored tap weights and summing each of a plurality of products to form a correlation output sample that is a member of a sequence corresponding to a channel represented by a selected tap weight, a single digital processor connected to said matched filter for time sharing all said bands and channels and processing any final signal and/or data processing or formatting, and a plurality of utilization devices connected to said single digital processor.

5. The communication receiver system defined in claim 4 wherein one of said bands is the S-band.

6. The communication receiver system defined in claim 4 wherein one of said bands is the L-band.

7. The communication receiver system defined in claim 4 wherein one of said bands is the S-band and another of said bands is the L-band.

* * * * *